Dec. 14, 1926.　　　　　　　　　　　　　　　　　1,611,114
C. G. HENNEY

WINDMILL GEARING AND OILING SYSTEM

Filed June 9, 1924

C. G. HENNEY　INVENTOR.

BY
Emil F. Lang ATTORNEY

Patented Dec. 14, 1926.

1,611,114

UNITED STATES PATENT OFFICE.

CLARENCE G. HENNEY, OF FAIRBURY, NEBRASKA; CHARLOTTE M. HENNEY, EXECUTRIX OF SAID CLARENCE G. HENNEY, DECEASED, ASSIGNOR TO FAIRBURY WINDMILL COMPANY, OF FAIRBURY, NEBRASKA, A CORPORATION OF NEBRASKA.

WINDMILL GEARING AND OILING SYSTEM.

Application filed June 9, 1924. Serial No. 718,895.

My invention relates to a combined gearing and lubricating system which is designed primarily for use on windmills, and wherein the gearing is employed to circulate the lubricating medium in a manner not heretofore employed in connection with this type of gearing.

Originally windmills were designed to be oiled or greased at irregular intervals, but when it was realized that the average windmill wheel makes from two to five times as many revolutions per week as the wheel of an average automobile makes, adequate lubrication assumed a new importance and stimulated invention in automatic oiling systems for windmills. One of the objects of my invention is the provision of an oiling system in which the gears are immersed in oil.

Windmills of numerous types are provided with pitmans and guide shoes for converting the movements of the shaft into reciprocatory movements which could be utilized for pumping water. This however necessitates bearings which are outside the lubricant container and which for this reason are insufficiently or not at all lubricated. Another object of my invention is the provision of a force feed lubricating system whereby the lubricant is fed to all of the bearings while the windmill is in operation. In accomplishing this object I utilize the superior advantages of helical gearing as applied to the driving parts of a windmill.

One of the most common troubles in connection with the lubrication of windmills is due to the fact that oil tends to creep out through the bearings. One of the objects of my invention is the provision of a novel device for preventing the oil from reaching the opening through which the shaft enters the lubricant reservoir.

Having in view these objects and others which will be mentioned in the following description, I will now refer to the drawings, in which—

Figure 1:
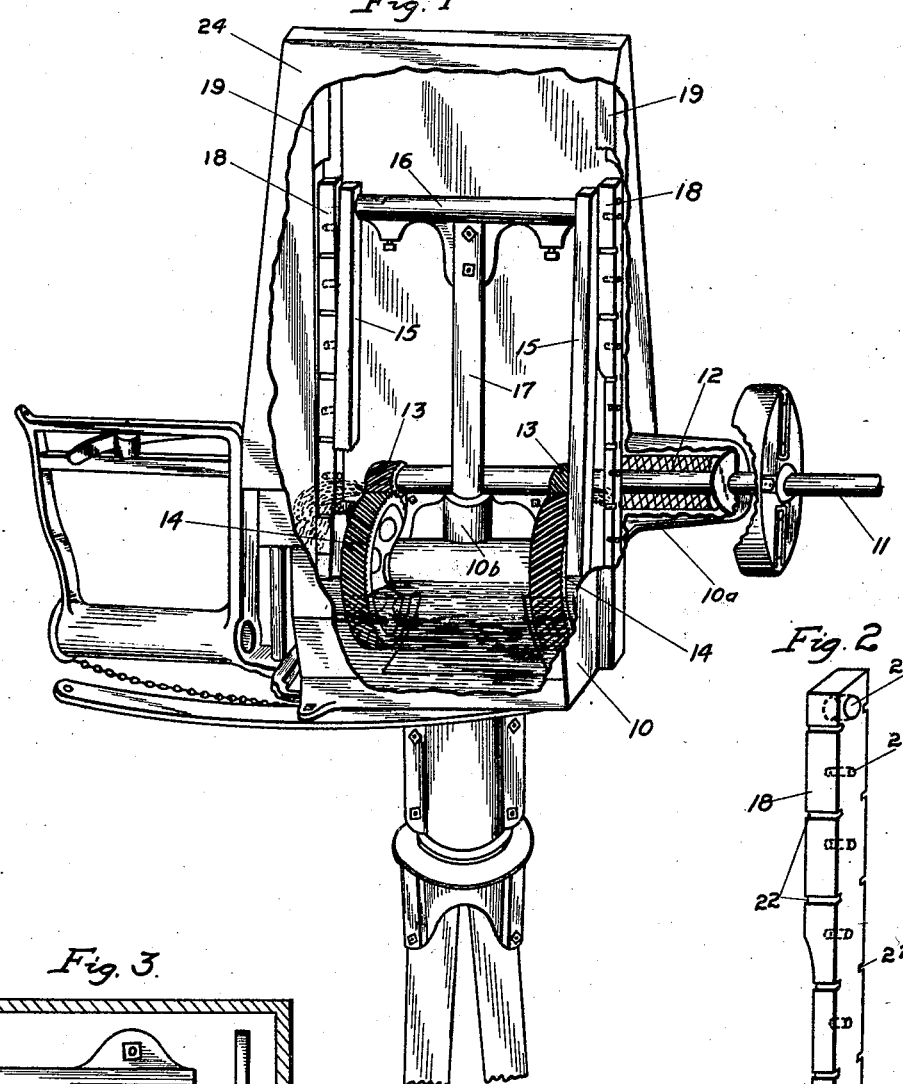
Figure 1 is a view in perspective of my gearing and oiling system, a portion of the hood being broken away to show the interior construction.

The casing 10 carries the working parts of the windmill and serves as a container of the lubricant in which the working parts are immersed. Its upper surface is open to give access to the gears as when applying the lubricant or when renewing worn bearings. Protruding from one of its sides adjacent the upper edge is a tubular member $10^a$ for receiving the bearing of the wheel or drive shaft, and within the casing 10 there is a vertically disposed tubular member $10^b$ for receiving the pump rod and for guiding its movements. The upper surface of the tubular member $10^b$ is considerably above the level of the oil. The parts 10, $10^a$, and $10^b$ are formed in one piece, preferably by casting, thus having no seams or joints through which the oil could work.

The wheel or drive shaft 11 enters the casing 10 through the portion $10^a$. This shaft is journalled in the bearing 12 which is positioned in the tubular member $10^a$. Inside the casing the shaft carries two helical pinions 13 which are pitched in opposite directions. Meshing with the pinions 13 are two helical gears 14 which are keyed or otherwise secured to a stub shaft, the gears 14 and their stub shaft being entirely inside the casing 10. Each gear 14 carries on its outer side an eccentrically mounted pitman 15, the pitmans 15 being pivoted at their upper extremities to the horizontal bar 16 which in turn carries the pump rod 17. The guide shoes 18 have only a linear vertical movement, being confined in their movement in the channeled guideways 19.

Helical gears and pinions have the advantage over spur gearing in the greatly increased meshing surface which thereby diminishes the danger of stripping the gears. I have arranged the gears and pinions on opposite sides of the pump rod and approximately equidistant therefrom with the result that there is little or no torsion, the load on one gear being positively equalized with the load on the other. Torsional strains are still further eliminated by arranging the two gears with their teeth pitched in opposite directions.

The lubricant is retained in the bottom portion of the casing 10, the lower portions of the gears 14 being always immersed in oil. As the gears turn, the spaces between the gear teeth serve as pockets for carrying the oil over the gears to the point where the gears and the pinions mesh. This meshing of the gears and pinions forces the oil out of the pockets with considerable force and in a horizontal direction parallel to the gear axis. By arranging the gears and pinions with their teeth pitched as indicated in the drawing, the oil is forced outwardly from the gears so that during the operation of the windmill the meshing of the gears and pinions forces small streams of oil against both of the guide shoes 18, the number of these streams increasing or decreasing with the speed of rotation of the shaft 10.

Figure 2:
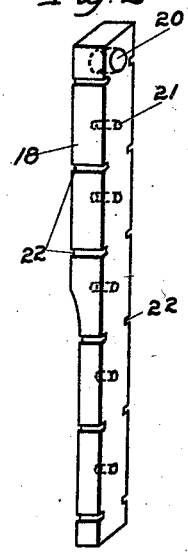
Figure 2 is a view in perspective of one of the guide shoes, showing particularly the channels and grooves for conveying the lubricant.

As before stated, the guide shoes 18 travel in the channeled guideways 19. Referring now to Figure 2, numeral 18 designates a guide shoe which is provided at its upper end with an aperture 20 whereby the guide shoe may be pivotally secured to the rod 16. Other apertures 21 are formed in the guide shoe and in addition saw cuts or grooves 22 are formed in the opposite edges of the guide shoe. The apertures 21 and grooves 22 extend through the guide shoe. In practice I prefer to form the apertures 21 and the grooves 22 with a slight downward slope toward the guideways 19.

It will readily be seen that the oil which is forced in streams against the guide shoes is largely caught in the apertures 21 and the grooves 22 and that the oil is thus conveyed to the back and lateral walls of the channeled guideways 19. The guide shoes being constructed of hard maple, quickly absorb a considerable quantity of oil and this oil with the oil that is being constantly fed in streams from the gears keeps the guideways effectively lubricated. During the reciprocation of the guide shoes however, the upper apertures and grooves pick up oil from the film in the guideway and carry it to higher levels, so that within a few seconds after the operation has been started a film of oil will be moving over the upper edge of the guide shoe and over all parts of the rod 16, thus lubricating all bearings connected with the rod 16.

Figure 3:
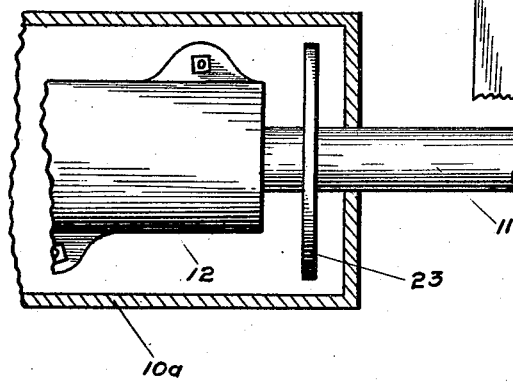
Figure 3 is a side view of a portion of the main shaft of the windmill, showing also a portion of the casing in section, and showing particularly the device for preventing the oil from reaching the outer side of the casing.

The wheel or drive shaft of a windmill is necessarily horizontal and it follows that its bearing is thus also horizontal. When an oil bath lubricating system is employed, the oil persists in creeping along on the wheel shaft and out of the casing. Not only is the oil thus wasted but it accumulates on the outer side of the casing where dust and grit adhere to it. This gives an unsightly appearance to the windmill and it endangers the turn table and other bearings outside the casing. I have effectively overcome the difficulty by means of the construction shown in Figure 3. The bearing 12 for the shaft 11 is secured inside the horizontally disposed tubular projection 10ª of the casing 10. The bearing 12 is spaced from the end wall of the part 10ª, and the washer 23 is secured to the shaft 11 in this space. The washer is driven on the shaft and is thus in effect integral with the shaft so that no oil can creep through the space between the washer and the shaft. It is essential that the washer fit so tightly on the shaft that no such space be left in the construction and it is essential also that the washer have no contact with anything except the shaft. When the shaft is not rotating the oil reaches the inner surface of the washer and is drawn down to the lower edge but it is prevented by gravity from moving over the edge and upward on the outer surface of the washer. When the windmill is not running the movement of the oil is due only to its viscosity and is consequently slow so that at such times little or no oil gathers on the washer and the little that does reach the washer soon drops off the lower edge. When the windmill is running the movement of the oil is more rapid but at such times it is thrown off from the washer in tangential directions after which it is carried back into the main oil reservoir in the bottom portion of the casing 10. I have found that with the washer as above described the oil cannot reach the outer surface of the casing whereas packings, gaskets and the like merely aggravate the trouble.

The casing is preferably in the form of a single casting, being thus seamless and without joints through which the oil would leak. The casing is formed with an open top so that access to the gearing and oil reservoir may be had. A hood or helmet 24, preferably of sheet steel or the like, covers the open top of the casing 10 and encases the pitmans, guide shoes and other working parts. The helmet is removable so as to give ready access to the interior of the casing 10. Windmills are always located in exposed positions where dust and grit are often in the air. Were the dust and grit permitted to enter the casing, the gears and bearings would soon be cut out and the efficiency of the windmill would be materially reduced because of the excessive friction resulting from the presence of the grit. These conditions would also cause the rapid deterioration of the oil. The helmet when in position, protects the working parts of the windmill by keeping out rain water, sand, or anything else which might interfere with the operation of the windmill.

It will be seen from the foregoing description that the lubrication is positive, thorough, and effective. A supply of oil of the proper grade requires no further attention for a year. When it is desired to renew the oil it is only necessary to drain the old oil out through a drain plug in the bottom of the casing and to introduce a supply of new oil through the top opening. It will also be seen that I have effectively overcome the difficulties due to the tendency of the oil to leak out of the casing.

Having thus described by invention in terms which will be readily understood by others skilled in the art to which it pertains, what I believe to be new and desire to secure by Letters Patent of the United States is:—

1. In a windmill, a pinion secured to the wheel shaft of the windmill, a gear meshing with said pinion, a pitman secured in eccentric relation at the side of said gear, a guide shoe pivotally secured to said pitman, means for confining the movements of said guide shoe to reciprocatory movements in the direction of the length of the guide shoe, and a reservoir for holding oil in contact with the lower portion of the said gear whereby oil is carried upwardly in the pockets between the gear teeth, the teeth of the gear and pinion being so formed that in meshing they force the oil out of the pockets between the gear teeth and toward and into contact with the said guide shoe.

2. In a windmill, a pinion secured to the drive shaft of the windmill, a gear meshing with said pinion, a pitman secured in eccentric relation at the side of said gear, a guide shoe pivotally secured to said pitman, a channeled member for guiding the movements of said guide shoe, and means for holding oil in contact with the lower portion of said gear whereby the oil is carried upwardly in the pockets between the gear teeth, the teeth of the gear and pinion being so formed that in meshing they force the oil out of the pockets between the gear teeth and toward and against the surface of the guide shoe, said guide shoe being provided with apertures extending therethorugh and so positioned as to receive the oil which is thrown by the meshing gear and pinion, the arrangement being such that the oil passing through the apertures is received in the said channeled member and is caused to move to the extremities of the guide shoe due to the sliding contact of the guide shoe with the channeled member.

3. In a windmill gearing and lubricating system, an intermeshing gear and pinion having helical teeth, the gear being partially immersed in lubricating oil whereby the rotation of the gear causes the oil to be picked up in the pockets between the gear teeth and to be carried around on the gear to the point where it meshes with the pinion, the oil being forced out to one side from between the meshing teeth, a pitman pivoted eccentrically to said gear, a guide shoe secured to said pitman, and a channeled guideway for receiving said guide shoe in a slidable relation, said guide shoe being positioned in the path of the streams of oil which are forced from between the intermeshing gear teeth.

4. In a windmill gearing and lubricating system, a casing which is adapted to receive lubricating oil in its lower portion, a wheel shaft entering said casing through an aperture which is positioned above the level of the oil in the casing, a bearing for the wheel shaft, said bearing being inside the casing and being spaced from the aperture through which the wheel shaft passes, and a washer surrounding said wheel shaft, said washer being substantially integral with the wheel shaft and being spaced from both the bearing and the wall of the casing, whereby oil which reaches the inner wall of the washer is thrown off centrifugally during the rotation of the washer and is thus prevented from reaching the aperture through which the wheel shaft enters the casing.

5. Lubricating means for a windmill drive mechanism, consisting of a casing adapted to contain a bath of oil, a wind wheel shaft projecting into the casing, a crank member mounted in the casing, oil ejecting gears between the wind wheel shaft and the crank member, one of said gears disposed to dip in said oil bath, a reciprocating pump rod mechanism rising above the crank member and connected thereto for actuation by the crank member, and a reciprocating oil feeding device connected to said pump rod mechanism and movable across the path of the oil ejected from said gears to intercept a portion of the oil and lubricate said reciprocating pump rod mechanism.

In testimony whereof I affix my signature.

CLARENCE G. HENNEY.